May 8, 1923.

C. A. HOWELL 1,454,514

RUNNER

Filed April 22, 1922

INVENTOR.
Charles A. Howell
BY Edward N. Pagelsen
ATTORNEY.

Patented May 8, 1923.

1,454,514

UNITED STATES PATENT OFFICE.

CHARLES A. HOWELL, OF ANN ARBOR, MICHIGAN.

RUNNER.

Application filed April 22, 1922. Serial No. 555,939.

*To all whom it may concern:*

Be it known that I, CHARLES A. HOWELL, a citizen of the United States, and residing at Ann Arbor, in the county of Washtenaw and State of Michigan, have invented a new and Improved Runner, of which the following is a specification.

This invention relates to means for facilitating the joining of the ends of two pipes, one of which is formed with a bell or hub at one end into which the adjacent end of the other pipe extends, and its object is to provide a simple and easily applied runner or dam which can be convolutely secured around the inserted pipe in contact with the end of the bell or hub to prevent loss of the metal which is run into space within the bell around the inserted pipe.

A further object of this invention is to provide a flexible runner which is adapted to be used in connection with pipes of different diameters.

Another object of this invention is to provide a runner and a spout therefor of poor heat conducting materials so that the point of connection with the usual elbow or sprue of metal will lack the crystals which form when the sprue is formed in contact with the cold metal of the bell which crystals either cause or are the result of the hardened condition of the metal at this point.

Figure 1:
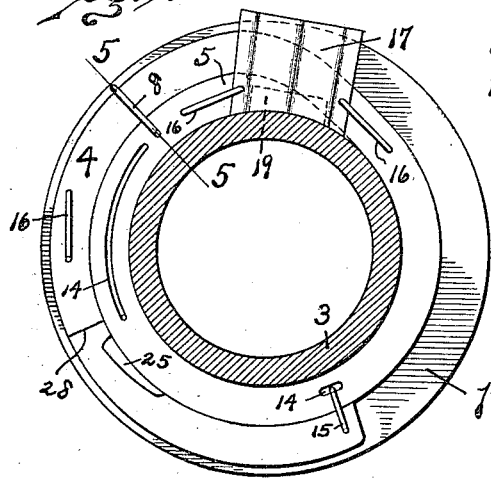
Figure 3:
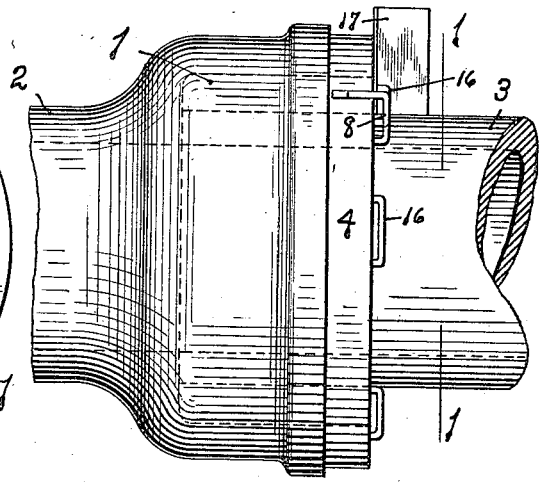
Figure 3:
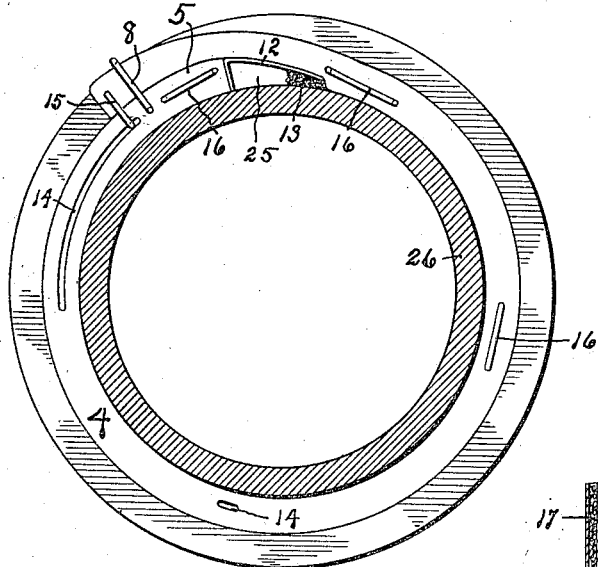
Figure 2:
Figure 5:
Figure 6:
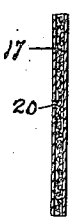
Figure 6:
Figure 4:
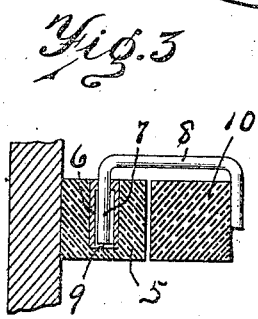

In the accompanying drawing, Fig. 1 is a section on the line 1—1 of Fig. 2. Fig. 2 is a side elevation of a pipe joint. Fig. 3 is a view similar to Fig. 1 of this improved runner in operative position on a larger pipe. Fig. 4 is a perspective of a paper spout. Fig. 5 is a section on the line 5—5 of Fig. 1, showing a fastener in position. Fig. 6 is a portion of a vertical section through the wall of the spout shown in Fig. 4.

Similar reference characters refer to like parts throughout the several views.

Water, gas and other pipes, especially when of cast iron, are usually made with a bell or hub at one end of each length to receive the straight end of the next length. Hemp or other fibrous packing is usually driven down into the bell around the inserted end to center this end and to act as a dam for the sealing metal which is poured into the bell or hub around the inserted pipe. This metal may be soft and malleable, lead for example, which can be caulked to cause it to tightly fill this space, or it may be an alloy which does not contract as it cools.

The device which serves as an outer wall to hold the melted metal in this space within the bell is usually called the runner and many different materials are employed for this purpose, most of them requiring more or less preparation for such use, a coating of wet clay usually being applied.

The present invention primarily consists of a strip of rubber (either solid or formed in layers with fabric between them), braided or woven asbestos compound, or other material capable of being secured in position and preferably rectangular in cross section.

In the drawing, the bell 1 on the end of the pipe 2 is shown to receive the end 3 of the next adjacent length and my improved runner 4 is shown convolutely wound around this end 3. The runner is preferably a strip of rubber, square in cross section, and molded or otherwise secured in this runner near the end 5 is a short sleeve 6 of metal adapted to receive one arm 7 of the fastener 8 which is preferably U-shaped and formed with an enlargement 9 to prevent it becoming lost and yet at the same time permit the other arm of this fastener to be moved out from the position shown in Figs. 1 and 3 to release the next wrap 10 of the runner.

When the runner is in the position shown in Figs. 1 and 2, a small substantially triangular space or sprue 19 is left between the end 5 and the next wrap, and communicating with the space within the bell. I prefer to place a protecting strip 12 of asbestos paper or metal (Fig. 3), bent to triangular form, in this sprue in order to protect the runner from being burned by the melted metal, for while the runner does not seem to be affected elsewhere to any extent by the metal poured into the bell, it is affected at the sprue as all the metal which flows into the bell contacts with the runner at this point. Fig. 3 also shows a small wad 13 of fibrous material for reducing the size of the sprue.

The runner is shown with narrow grooves 14 of any desired length to receive the inturned arm of the fastener 15 (preferably similar to the one shown in Fig. 5), although these grooves and fasteners 15 may be omitted if desired. Other fasteners 16, preferably L-shaped, are also mounted on the runner to retain the spout 17 in position, this spout being of folded paper with the side 18 cut away at its lower end so as to connect the interior of the spout to the sprue passage 19 formed by the runner. If desired, this spout may be formed of two thicknesses of paper with a layer 20 of asbestos or cotton fibres between them. The edges 22 of this spout are held flat against the end of the bell by these fasteners 16 and the lower end of the spout may be trimmed or bent to fit the inserted end 3. One leg of each of these fasteners 16 may be rotatable in the runner.

The length of the runner will depend upon the diameters of the pipes 3, and the number of fasteners 16 attached to each runner upon the number of different sizes of pipes on which each runner is to be used. One fastener 16 will always be at the end 5 while the other fasteners 16 will be spaced about six inches apart, the regular sizes of water and gas pipes usually varying two inches in diameter.

One end of this runner may be formed with a notch 25 so as to produce a short sprue when fitted to the particular pipe 26 for which the runner is designed.

When this runner is made of rubber or of fabric impregnated with rubber, no coating of clay is necessary to form a tight joint. Rubber does not cool the metal to the same extent as do the clay covered asbestos runners, so that the metal is not chilled until it reaches its proper place in the bell. The spout is so far away from the end of the bell that the entering metal is not chilled, and any crystals which may form at the elbow between the sprue 19 and the metal in the spout are all cut away when the gate-button is removed.

Any other desired type of spout and spout attaching means may be used in connection with this runner. While I prefer the entire runner to be of flexible material, the part from the line 28 (Fig. 1) outward may be made of iron or other heat resisting materials. While I prefer to form this runner of rubber, it may be made of alternate layers of rubber and fabric, of impregnated asbestos, or of any other material which can be made into a flexible strip that can be wound around the pipe 3 and lie against the bell 1, and will not be burned by the hot metal.

I claim:—

1. A flexible runner adapted to be placed around a pipe, a fastener to hold it in position, a spout entirely disconnected from said fastener and adapted to be positioned independently thereof, and independent means to hold the spout against the side of the runner.

2. A flexible runner adapted to be convolutely wound around a pipe end and in contact with the end of a bell into which said pipe end is inserted, an adjustable fastener pivoted at one end of the runner and adapted to engage the next wrap on the outside of said end to hold the runner in position against the end of said bell, and a clip attached to the runner to hold a spout against said inserted pipe end and against the side of the runner away from the bell.

3. A flexible runner adapted to be convolutely wound around an inserted pipe in contact with the end of the receiving bell, means to hold it convolutely wound, a spout having a flat face adapted to fit against the opposite side of the runner from the bell and against the inserted pipe, and means independent of the means for holding the runner in convolute form to secure the spout to the runner.

4. A flexible runner adapted to be convolutely wound around an inserted pipe in contact with the end of the receiving bell, means to hold it convolutely wound, a spout having a flat face adapted to fit against the opposite side of the runner from the bell and against the inserted pipe, and means to secure the spout, said fastening means comprising a substantially U-shaped metal clip having one arm rotatably and slidably mounted near the inner end of the runner and the other arm extending over the outside of the next wrap of the runner.

5. A flexible runner adapted to be convolutely wound around an inserted pipe in contact with the end of the receiving bell, means to hold it convolutely wound, a spout having a flat face adapted to fit against the opposite side of the runner from the bell and against the inserted pipe, and means to secure the spout, said securing means comprising substantially L-shaped clips, each having one leg journaled in the runner and the other leg adapted to engage the spout.

CHARLES A. HOWELL.